(12) United States Patent
Tsai et al.

(10) Patent No.: US 7,020,345 B2
(45) Date of Patent: Mar. 28, 2006

(54) METHODS AND SYSTEM FOR ILLUMINANT-COMPENSATION

(75) Inventors: Yao-Hong Tsai, Hsinchu (TW);
Yea-Shuan Huang, Hsinchu (TW);
Cheng-Chin Chiang, Hsinchu (TW);
Chun-Wei Hsieh, Hsinchu (TW)

(73) Assignee: Industrial Technology Research Institute, Hsinchu (TW)

( * ) Notice: Subject to any disclaimer, the term of this patent is extended or adjusted under 35 U.S.C. 154(b) by 681 days.

(21) Appl. No.: 09/842,048

(22) Filed: Apr. 26, 2001

(65) Prior Publication Data

US 2003/0007685 A1 Jan. 9, 2003

(51) Int. Cl.
*G06K 9/40* (2006.01)

(52) U.S. Cl. .................................. 382/274; 382/118

(58) Field of Classification Search ................ 382/118, 382/169, 274
See application file for complete search history.

(56) References Cited

U.S. PATENT DOCUMENTS

| | | | |
|---|---|---|---|
| 4,824,246 A | | 4/1989 | Thornton, Jr. |
| 4,975,970 A | * | 12/1990 | Zettel et al. ................ 382/169 |
| 5,089,976 A | | 2/1992 | Cate et al. |
| 5,642,431 A | * | 6/1997 | Poggio et al. .............. 382/118 |
| 5,991,456 A | | 11/1999 | Rahman et al. |
| 6,148,092 A | * | 11/2000 | Qian .......................... 382/118 |
| 6,445,812 B1 | * | 9/2002 | Lai et al. .................... 382/141 |

OTHER PUBLICATIONS

B. Widrow et al., Neural Nets for Adaptive Filtering and Adaptive Pattern Recognition, Computer, vol. 21, No. 3, pp. 25-39, Mar. 1988.
C. Garcia et al., Face Detection Using Quantized Skin Color Regions Merging and Wavelet Packet Analysis, IEEE Trans. on Multimedia, vol. 1, No. 3, pp. 264-277.
K.K. Sung et al., Example-Based Learning for View-Based Human Face Detection, IEEE Trans. on Pattern Analysis and Machine Intelligence, vol. 20, No. 1, Jan. 1998, pp. 39-51.
Matthew A. Turk et al., Face Recognition Using Eigenfaces, Vision and Modeling Group, The Media Laboratory, Massachusetts Institute of Technology, 1991 IEEE, pp. 586-591.

* cited by examiner

*Primary Examiner*—Vikkram Bali
*Assistant Examiner*—Colin LaRose
(74) *Attorney, Agent, or Firm*—Finnegan, Henderson, Farabow, Garrett & Dunner, L.L.P.

(57) ABSTRACT

The present invention relates to methods and systems for an illuminant compensation. In particular, these methods and systems include a method for operations on an image, for example, an image of a human face. In the described methods and systems, it is determined for each pixel in the image whether it is part of the face region. A surface fitting is then determined based on only the pixels that are determined to be part of the face region. Also, described are methods and systems for image normalization wherein the standard deviation and average for the gray levels of the pixels are determined and then used to normalize the image so that the gray level for each of the pixels falls between a particular range.

20 Claims, 9 Drawing Sheets

METHODS AND SYSTEM FOR ILLUMINANT-COMPENSATION

BACKGROUND OF THE INVENTION

This invention relates to illuminant-compensation mechanisms, and more specifically to methods and systems for an illuminant-compensation mechanism for operations on an image with a human face.

Image color (or image gray level) is very sensitive to variations in lighting, thus resulting in an image of an object appearing considerably different under different illuminations. Further, psychophysical experiments have shown that the human visual system has difficulty identifying images of the same face under considerably different illuminations (see, e.g., Y. Moses, S. Edelman, and S. Ullamn, "Generalization of Novel Images in Upright and Inverted Faces," Perception, vol. 25, pp. 443–461, 1996). Likewise, computer vision systems have difficulty obtaining a high-level of classification accuracy if face samples in the training and testing sets have different lighting conditions.

Illuminant-compensation preprocessing systems have been used to reduce the differences resulting from illumination variations. Presently, most illuminant-compensation algorithms use gray level values for the entire image or an oval region inside the image when correcting for lighting differences. However, problems can arise because current systems do not take effects of extreme lighting conditions on a person's hair or brow, background lighting conditions or heavy shadows into consideration during illuminant-compensation.

Accordingly, there is a need for improved methods and systems for illuminant compensation.

SUMMARY OF THE INVENTION

Methods and systems consistent with the invention, as embodied and broadly described herein, comprise a method for illuminant compensation of an image including a face region that includes the steps of determining a surface fitting based on the face region for the image, generating an illuminant corrected image using the surface fitting and the image, and normalizing the image.

In another embodiment, such methods and systems comprise a system for illuminant compensation of an image including a face region that includes a memory, and a processor, wherein, the memory stores a program that is operative with the processor to perform the steps of determining a surface fitting based on the face region for the image, generating an illuminant corrected image using the surface fitting and the image, and normalizing the image.

In yet another embodiment, such methods and systems comprise a computer readable medium storing a program for illuminant compensation of an image, including a face region that is operative with a processor to perform a method including the steps of determining a surface fitting based on the face region for the image, generating an illuminant corrected image using the surface fitting and the image, and normalizing the image.

In yet another embodiment, such methods and systems comprise a method for determining a surface fitting for an image that includes a plurality of pixels each having a color, wherein the image includes a face region, that includes the steps of determining for each pixel whether the pixel's color is within a predetermined set of colors, determining the pixel to be part of the face region if it is determined that the pixel's color is within the predetermined set of colors, and determining a surface fitting for the image, wherein the surface fitting is determined using only the pixels that were determined to be part of the face region.

In yet another embodiment, such methods and systems comprise a method for image normalization of an image that includes a plurality of pixels, each having a gray level, that includes the steps of computing an average gray level for the plurality of pixels in the image, computing a standard deviation of the gray level for the plurality of pixels in the image, and transforming the gray level for each pixel of the plurality of pixels to a gray level between a predetermined range using the computed average gray level and the computed standard deviation.

DETAILED DESCRIPTION

Figure 1:
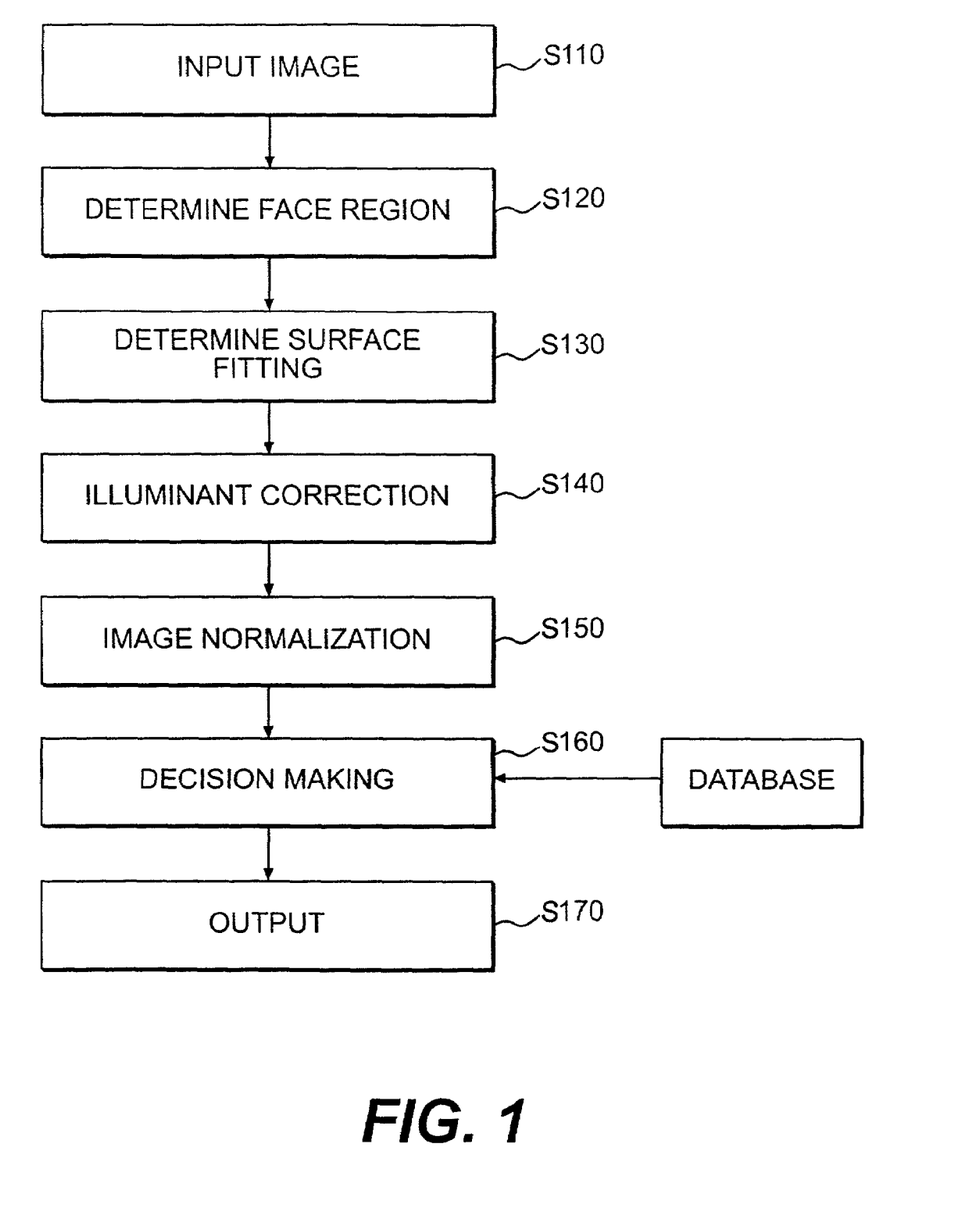
FIG. 1 illustrates a flowchart for an illuminant-compensation method for operations on a human face, in accordance with methods and systems consistent with the invention.

FIG. 1 illustrates a top-level flowchart for an illuminant-compensation method for operations on a human face, in accordance with methods and systems consistent with the invention. This algorithm can be used as a preprocessing step or a generic module for operations in applications such as face detection systems, face tracking systems, face recognition systems, video surveillance systems, object-based video coding systems, human computer interaction systems, or other types of image processing systems. This program may be embodied in a program or firmware that a computer or other system may execute.

The first step in the process illustrated by FIG. 1 is obtaining the input image. (S110). This image may be obtained, for example, from a computer's hard drive or memory, a server over the network or from any other place storing the image. Further, the image may be received in the computer's memory in real-time when the image is form a device such as camera or video player connected to the computer directly or through a network. Next, the face region is determined (S120). As previously discussed, existing illuminant-compensation algorithms typically use gray level values for the entire image or an oval region inside the image. In a preferred embodiment, the face region is first located in the image. Pixels outside the face region are then ignored in computing the lighting variations. Thus, only lighting variations across the face are taken into consideration during illuminant compensation.

In determining the face region, the first step is preferably transforming each pixel from the RGB color space to the $YC_bC_r$ color space. This may be accomplished using the following equations:

$$Y=0.299*R+0.587*G+0.114*B,$$

$$C_b=0.564*(B-Y),$$

$$C_r=0.713*(R-Y).$$

where Y represents the intensity, $C_b$ and $C_r$ represent the chrominance plane, G represents the Green level, B represents the Blue level, and R represents the Red level.

Next, each pixel is checked to see if its color is a skin color. If so, the skin-color pixel is treated as part of the face region. For each pixel, the following rules are preferably used to determine if the pixel is a skin color:

$$\text{if } (Y > 128) \; \theta_1 = -2 + \frac{256-Y}{16};$$

$$\theta_2 = 20 - \frac{256-Y}{16};$$

$$\theta_3 = 6; \theta_4 = -8;$$

$$\text{if } (Y \leq 128) \; \theta_1 = 6; \theta_2 = 12; \theta_3 = 2 + \frac{Y}{32};$$

$$\theta_4 = -16 + \frac{Y}{16}.$$

The pixel is then treated as a skin-color pixel if each of the following inequalities are satisfied:

$$C_r \geq -2(C_b+24); \; C_r \geq -(C_b+17);$$

$$C_r \geq -4(C_b+32); \; C_r \geq 2.5(C_b+\theta_1);$$

$$C_r \geq \theta_3; \; C_r \geq 0.5(\theta_4-C_b); \text{ and}$$

$$C_r \leq \frac{220-C_b}{6}; \; C_r \leq \frac{4}{3}(\theta_2 - C_b).$$

For a further description of these rules, see C. Garcia and G. Tziritas, "Face Detection Using Quantized Skin Color Regions Merging and Wavelet Packet Analysis, "IEEE Trans. on multimedia, vol. 1, no. 3, pp. 264–277, September 1999, which is hereby incorporated by reference.

FIGS. 2a–2d illustrate several face images of a number of exemplary persons, in accordance with methods and systems consistent with the invention. The first row of FIG. 2 illustrates two face images under normal lighting conditions (FIGS. 2(a) and 2(b)) and two biased images under extreme lighting conditions (FIGS. 2(c) and 2(d)). The second row of FIG. 2 illustrates the corresponding face images where black pixels are used to represent the respective face regions.

Referring back to FIG. 1, the next step is preferably surface fitting (S130). A simple image processing approach that may be used in surface fitting is to fit a function that varies across the image in relation to the intensity values of the pixels. (see e.g., K. K. Sung, "Learning and Example selection for Object and Pattern Detection," Ph.D. Thesis, MIT AI Lab, January 1996, which is hereby incorporated by reference.) For example, the gray level of a pixel at coordinate (x,y) may be represented by G(x,y). Then, a linear model parameterized by a, b, and c, may be fit to the image:

$$[x \; y \; 1] \cdot \begin{bmatrix} a \\ b \\ c \end{bmatrix} = G(x,y)$$

If all the pixels in the image are used, these equations may produce an over-constrained matrix. Preferably, this matrix system is solved using the pseudo-inverse method:

$$A \cdot \begin{bmatrix} a \\ b \\ c \end{bmatrix} = G$$

$$\begin{bmatrix} a \\ b \\ c \end{bmatrix} = A^{-1} G$$

By using a linear model to represent brightness differences across the image, the variations are limited to a linear variation. Thus, using a linear model helps to keep the number of parameters low and allows for a quick fit. This model can therefore be generalized to $(ax+by+c)^n = G(x,y)$ or even $F(x,y)=G(x,y)$ to fit the original image, where n is the degree of surface function and F(x,y) is the general-type surface function. To avoid possible extensive computations that may be involved in solving an over-constrained matrix problem, a discrete least-squares approximation may be used. The discrete least squares approximation is a numerical method to approximate the solution of matrix systems and may reduce the computational time when compared with the pseudo-inverse method if the degree of surface function is large. For a further description of discrete least-squares approximation, see R. L. Burden and J. D. Faires, Numerical Analysis, PWS-KENT, Boston 1989, which is hereby incorporated by reference.

Figure 2:
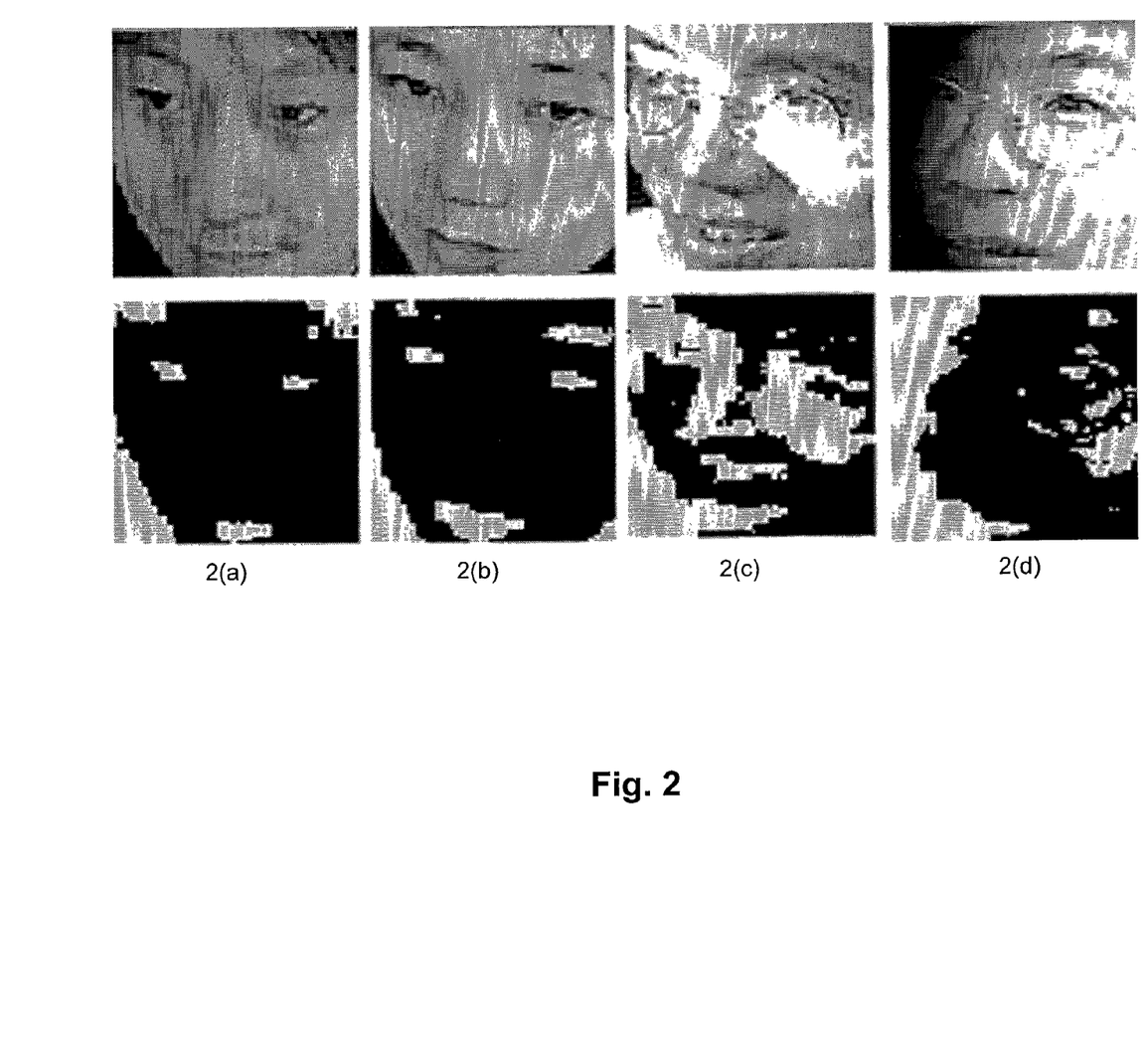
FIGS. 2a–2d illustrate several face images of exemplary persons, in accordance with methods and systems consistent with the invention.
Figure 3:
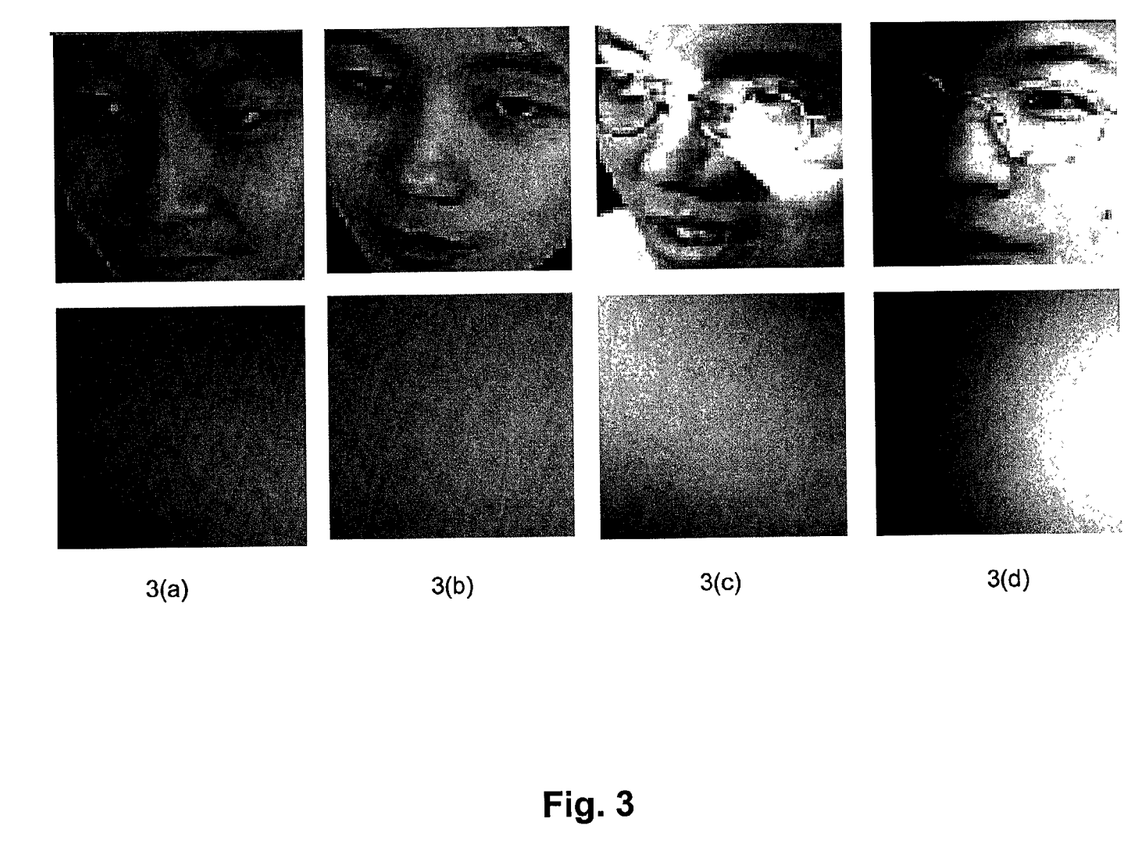
FIGS. 3a–3d illustrate the results of a surface fitting for a number of exemplary images including a face region, in accordance with methods and systems consistent with the invention.

FIG. 3 illustrates the results of surface fitting for n=2 for the face regions illustrated in the second row of FIG. 2, in accordance with methods and systems consistent with the invention. The first row of FIG. 3 illustrates the original image as shown in FIG. 2. The second row illustrates the corresponding surface fitting. As illustrated, the surface fitting approximates the overall brightness of each part of the face region and may be used to reduce the effects from hair, brow, background and/or heavy shadows caused by extreme lighting condition.

Referring back to FIG. 1, the next step is illluminant correction (S140). This step comprises subtracting the determined surface fitting from the image in order to compensate for lighting variations:

$$G(x,y)-(ax+by+c)^n \text{ or}$$

$$G(x,y)-F(x,y)$$

Figure 4:
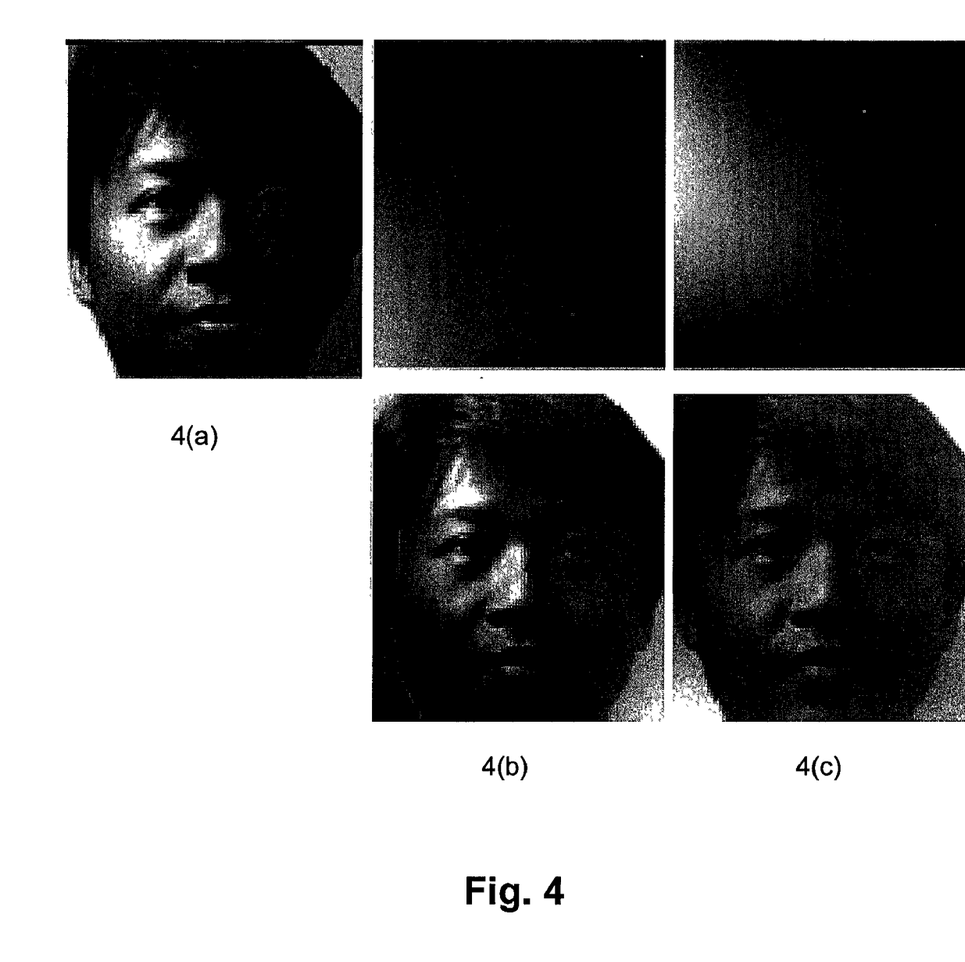
FIGS. 4a–4c illustrate an example of an exemplary image before and after illuminant compensation, in accordance with methods and systems consistent with the invention.

FIG. 4 illustrates an example of an image before and after illuminant compensation, in accordance with methods and systems consistent with the invention. As shown, FIG. 4(a) illustrates an image with the light source in the upper-left corner of the image. The first row of FIG. 4(b) illustrates a surface fitting for the image of FIG. 4(a) that is based in the whole image, while the first row of FIG. 4(c) illustrates a surface fitting based on only the face region. The second row in FIGS. 4(b) and 4(c) illustrate the results of illuminant correction using the surface fitting of the corresponding first row. As shown, the face illustrated in FIG. 4(b) is less biased by hair, brow, and background lighting variations than the face illustrated in FIG. 4(a).

Referring back to FIG. 1, the next step is preferably image normalization (S150). This step is used to remove noise and provide a more constant illumination across the image. This step is preferably accomplished by first computing the average gray level, m, and the standard deviation, d, for the skin-color pixels in the face region, where S is the total number of skin-color pixels and G(i) is the gray level of pixel i:

$$m = \frac{1}{S} \sum_{i \in \text{skin-color pixels}} G(i)$$

$$d = \sqrt{\frac{1}{S} \sum_{i \in \text{skin-color pixels}} (G(i) - m)^2}$$

Next, each image's gray level, G(i), is transformed by the following equation, where β is a scale factor for converting each of the transformed gray levels to a level between 0 and 255:

$$G' = 128 + \frac{(G(i) - m)}{d} * \beta$$

After normalization, the transformed gray levels will have an average gray level close to 128.

Figure 5:
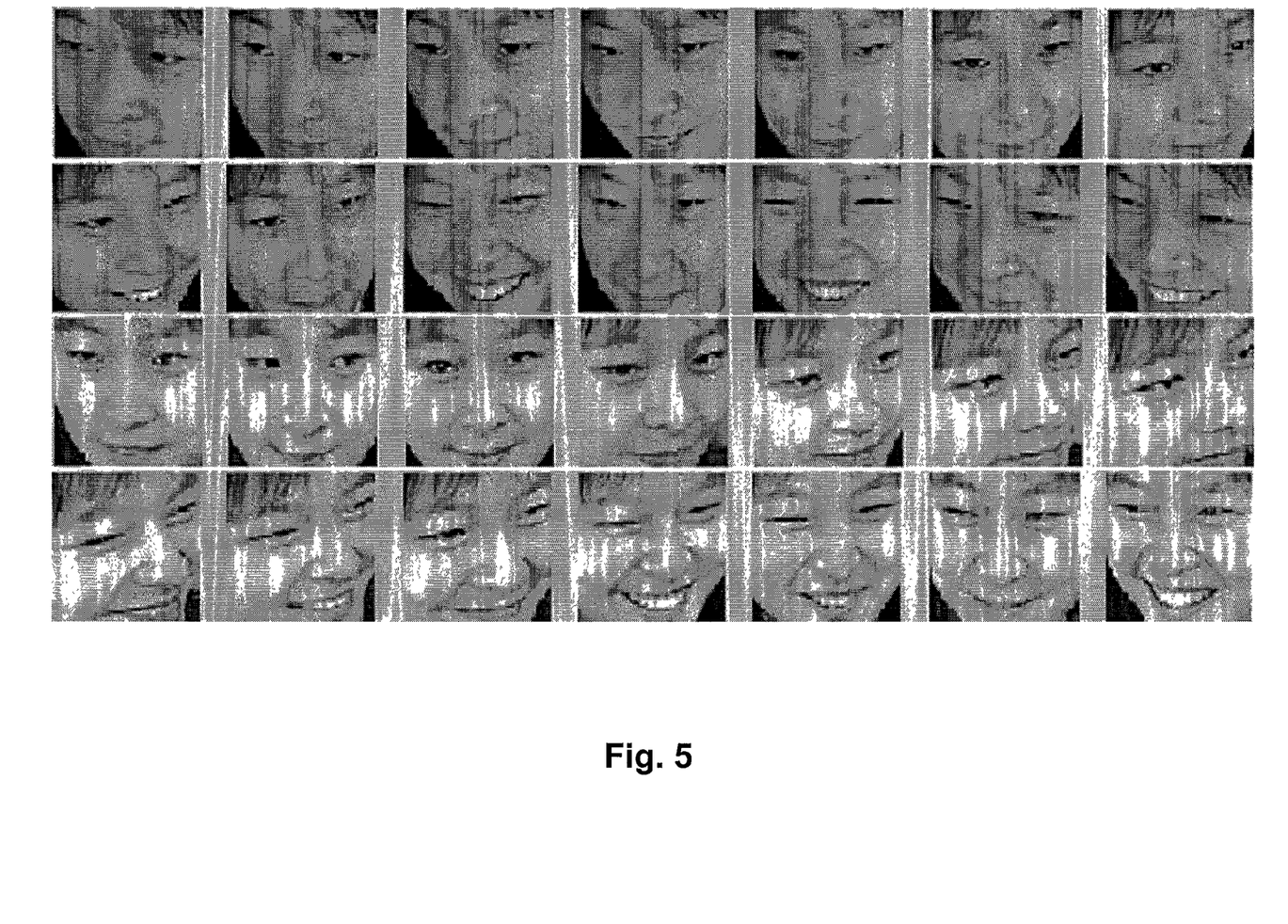
FIG. 5 illustrates an example of sample results of illuminant compensation, in accordance with methods and systems consistent with the invention.

FIG. 5 illustrates an example of sample results of illuminant compensated images determined using the above-described method, in accordance with methods and systems consistent with the invention. The first row of FIG. 5 illustrates six different original images of the same exemplary person taken with different lighting conditions. The second row illustrates surface fittings determined for the face region of the original images. The third row illustrates the result after illuminant correction. The fourth row illustrates the result after image normalization. As illustrated, the transformed images have more similar gray-level distributions than the original images. As such, the transformed images may then be used for decision making, such as, for example, by a face classifier to determine a person's distinctive characteristics.

Referring back to FIG. 1, the next step is decision making (S160). During this step, the illuminant compensated image is processed by a particular application. As discussed above, the illuminant compensated image may be used for various applications, such as face detection, face tracking, face recognition, video surveillance, object-based video coding, human computer interaction and other types of image processing in applications. A database may optionally be used to store information that is retrieved during decision making.

Figure 6:
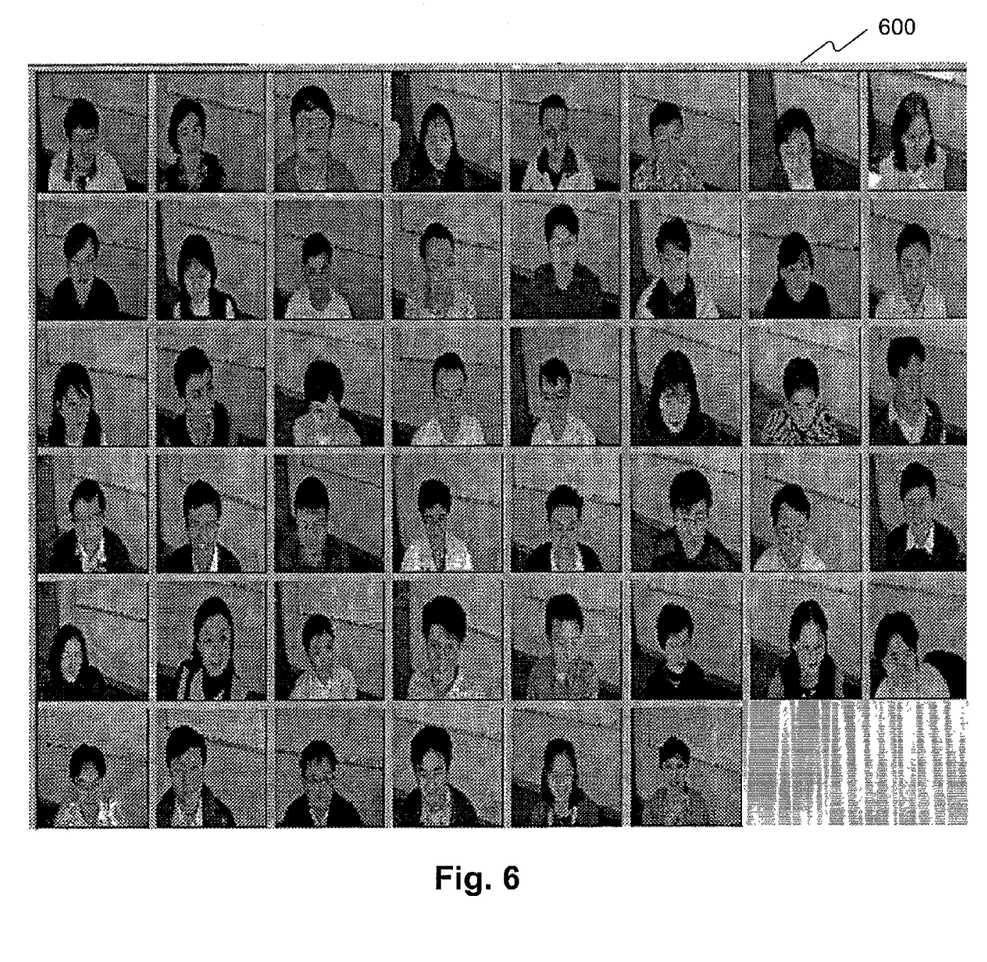
FIG. 6 illustrates a set of images, in accordance with methods and systems consistent with the invention.

For example, if the particular application is face recognition, the database may store information regarding various persons' faces. As an example, FIG. 6 illustrates a set of exemplary images of faces 600 included in a database that may be used during decision making, in accordance with methods and systems consistent with the invention. This information may then be referred to during the decision making step to see if the face in the illuminant compensated image matches any of the faces in the database.

Figure 7:
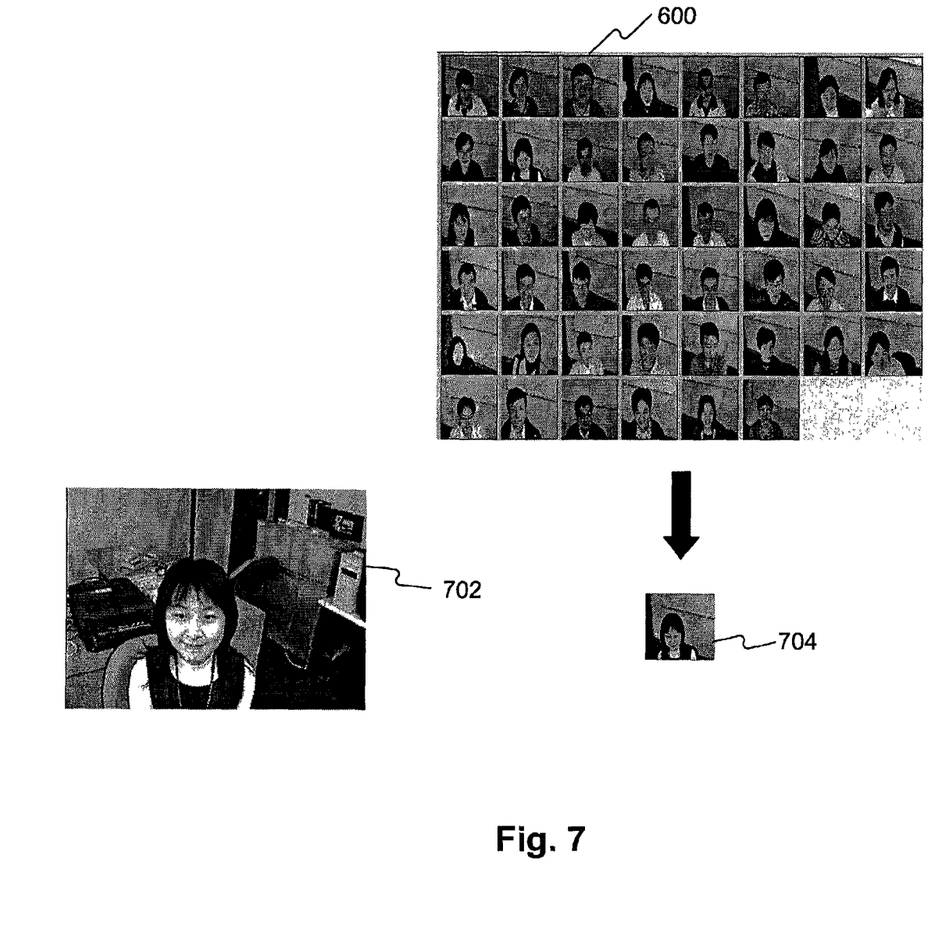
FIG. 7 provides an illustrative example of decision making, in accordance with methods and systems consistent with the invention.

FIG. 7 provides an illustrative example of decision making, in accordance with methods and systems consistent with the invention. As illustrated, an image 702 processed according to the above described steps is input to this step. This image is then compared to each of the images in the set of images 600 to determine if there is a match (e.g., satisfies a set of criteria). The matching image and any associated information may then be provided to the user.

Referring back to FIG. 1, the next step is outputting the results of the decision making (S170). As will be obvious to one of skill in the art, this step could comprise displaying or printing the results of the decision making (e.g., face detection, face tracking, face recognition, and/or other types of image processing) such as, for example, displaying or printing a matching image from the database and/or additional information such as, for example, biographical information regarding the person in the matching image).

Figure 8:
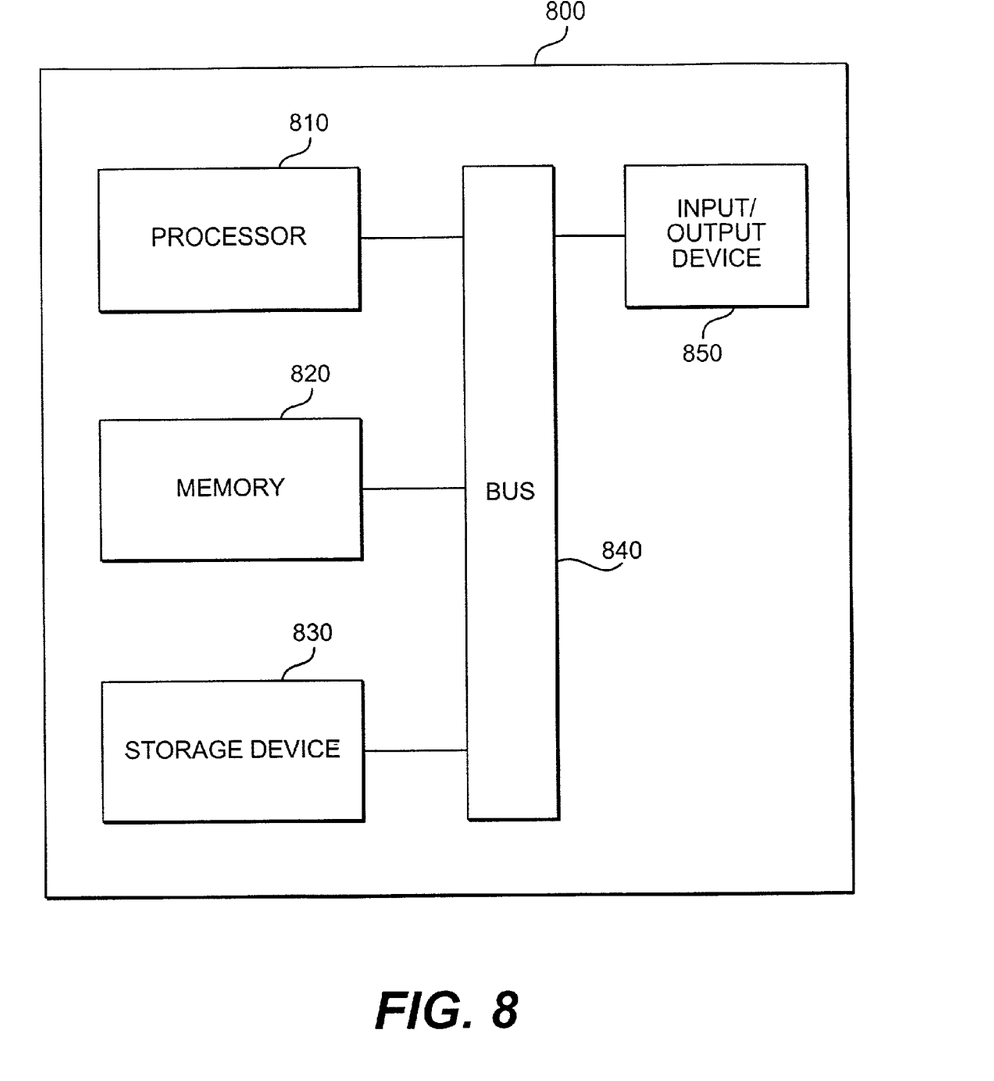
FIG. 8 illustrates a computer system, in accordance with methods and systems consistent with the invention.

FIG. 8 illustrates a computer system 800, in accordance with methods and systems consistent with the invention. As illustrated, the computer may include a processor 810, a memory 820, a storage device 830, a bus 840, and a input/output (I/O) device 850. The storage device 830 may be a hard drive, a floppy disk drive, read/write or standard a Compact Disc (CD) drive, or any other type of storage device. The I/O device 650 may be a modem, a network card or any other type of I/O device.

The above-described methods may be accomplished by a computer program that is stored in the memory 820 or storage device 830 and executed by the processor 810. The image to be processed may be received at the computer through the I/O device 850 or may be stored on the storage device 830 or in memory 820.

After the image is processed it may be sent to another device via the I/O device 850 or stored on the storage device 830, or the processed image may remain in the memory 820.

As discussed above, after illuminant compensation the image may be processed by some other application such as, video surveillance, object-based video coding, human computer interaction, face detection, face tracking, face recognition or some other type of image processing. This image processing may be performed in the same computer as the illuminant compensation, or the illuminant-compensated image may be sent to another device for further image processing.

Further, as will be obvious to one in the art, the above described illuminant compensation method may be accomplished by other types of devices capable of running programs, or a device with specific hardware for performing the above described process.

The following provides an illustrative example of a face classifier system in which the above described illuminant compensation method was implemented. Referring back to FIG. 6, this figure illustrates an example set of 46 images in a database that was used during this experiment. Each of these images includes a face image that was manually extracted from a whole image. In general, an extracted face image is the rectangular portion of an image that contains a person's eyebrows, eyes, nose, and mouth.

In creating the database, each image was first normalized to a 25 pixel×25 pixel image in order to help reduce computational time. As will be obvious to one of skill in the art, different normalization parameters may be used. The normalized images were then applied to the above described illuminant compensation mechanism and accordingly an illuminant compensated image was generated for each image in the database.

Figure 9:
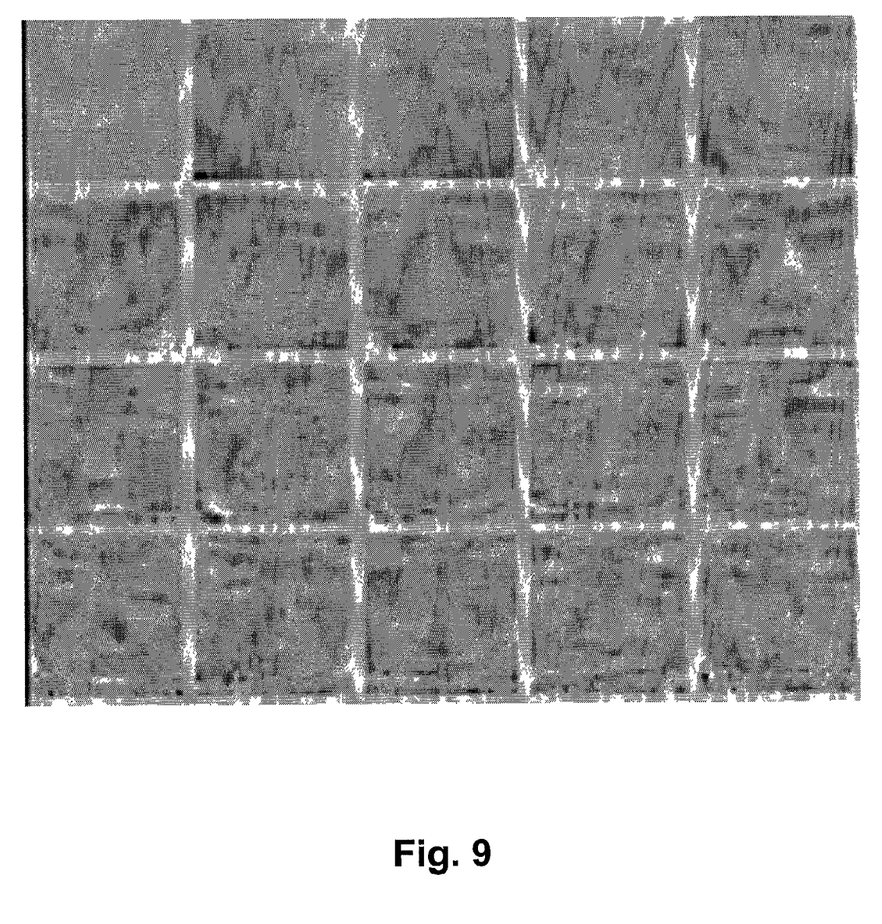
FIG. 9 provides an illustrative example of Linear Discriminant Analysis (LAD) derived bases, in accordance with methods and systems consistent with the invention.

The gray levels of these compensated images were then mapped to 20 Linear Discriminant Analysis (LDA) derived bases such as illustrated in FIG. 9. These bases were used to test the performance of the system, where the exact number of bases was a designer's choice based on the designer's experience. The feature dimension, which was extracted from the face region, was 20. A vector with 20 entries was chosen to be the feature where each entry is a real number obtained from the projection of the face region on the LDA bases.

A back propagation containing three-layer network architecture set to 20 (input)-80 (hidden)-46 (output), was then used to develop the face classifier. As will be obvious to one of skill in the art, back propagation is a commonly used neural network for learning in artificial intelligence. The network was then trained as follows. For each person in each of the 46 images in the database, there were 28 additional images of the particular person. The odd numbered images of each person were then processed to obtain 20 features that would be used as the input to the back propagation neural network. These features were obtained by mapping the images to 20 LDA-derived bases as discussed above. The 46 outputs from the neural network were then the features that were used for identifying the 46 persons in the database.

The trained network was then referred to as the face classifier. In testing, the even-numbered images of each person were used. The recognition rate of the face classifier was determined as follows, $$\text{recognition rate} = \frac{S}{14 \times 46} = \frac{S}{644}$$

where S is the number of times the face classifier successfully identified the correct person.

In testing, the face classifier using the above described illuminant compensation mechanism had a recognition rate of 81.7%, while one not using the mechanism had a recognition rate of 75.4%.

Other embodiments of the invention will be apparent to those skilled in the art form consideration of the specification and practice of the invention disclosed herein. It is intended that the specification and examples be considered as exemplary only, with a true scope and spirit of the invention being indicated by the following claims.

What is claimed is:

1. A method for illuminant compensation of an image of a human face, wherein the image includes a plurality of color pixels, comprising:
    determining a face region based on skin color pixels, wherein the skin color pixels are determined based on intensity and chrominance color of the pixels;
    determining a surface fitting based on the face region for the image using a linear model, wherein the surface fitting is determined using only the skin color pixels of the face region;
    generating an illuminant corrected image using the surface fitting and the image; and
    normalizing the illuminant corrected image to generate an illuminant compensated image.

2. The method of claim 1, wherein the illuminant corrected image is generated by subtracting the surface fitting from the image.

3. The method of claim 1, wherein the image includes a plurality of pixels each having a gray level, and wherein the step of normalizing the image, comprises the substeps of:
    computing an average gray level for the plurality of pixels in the image;
    computing a standard deviation of the gray level for the plurality of pixels in the image; and
    transforming the gray level for each pixel of the plurality of pixels to a gray level within a predetermined range using the computed average gray level and the computed standard deviation.

4. The method of claim 3,
    wherein in the step of computing the average gray level for the plurality of pixels, only the pixels of the face region are used in computing the average gray level; and
    wherein in the step of computing the standard deviation, only the pixels of the face region are used in computing the standard deviation.

5. The method of claim 1, further comprising:
    inputting the image from electronic sources in real-time.

6. The method of claim 1, further comprising:
    deciding that the human face in the illuminant compensated image matches one of a plurality of faces stored in a database.

7. The method of claim 6, further comprising:
    outputting the illuminant compensated image and information associated with the matched one of plurality of faces stored in a database.

8. The method of claim 1, wherein the linear model is further simplified by a discrete least-square approximation to avoid extensive computations.

9. A system for illuminant compensation of an image of a human face, wherein the image includes a plurality of color pixels, comprising:
    a memory; and
    a processor;
    wherein the memory stores a program that is operative with the processor to perform the following steps:
        determining a face region based on skin color pixels, wherein the skin color pixels are determined based on intensity and chrominance color of the pixels;
        determining a surface fitting based on the face region for the image using a linear model, wherein the surface fitting is determined using only the skin color pixels of the face region;
        generating an illuminant corrected image using the surface fitting and the image; and
        normalizing the illuminant corrected image to generate an illuminant compensated image.

10. The system of claim 9, wherein in the step of generating the illuminant corrected image, the illuminant corrected image is generated by subtracting the surface fitting from the image.

11. The system of claim 9, wherein the image includes a plurality of pixels each having a gray level, and wherein the step of normalizing the image, comprises the substeps of:
    computing an average gray level for the plurality of pixels in the image;
    computing a standard deviation of the gray level for the plurality of pixels in the image; and transforming the gray level for each pixel of the plurality of pixels to a gray level within a predetermined range using the computed average gray level and the computed standard deviation.

12. The system of claim 11, wherein in the step of computing the average gray level for the plurality of pixels, only the pixels of the face region are used in computing the average gray level; and wherein in the step of computing the standard deviation, only the pixels of the face region are used in computing the standard deviation.

13. A computer readable medium storing a program for illuminant compensation of an image of a human face, wherein the image includes a plurality of color pixels and the program is operative with a processor to perform a method comprising the steps of determining a face region based on skin color pixels, wherein the skin color pixels are determined based on intensity and chrominance color of the pixels;

determining a surface fitting based on the face region for the image using a linear model, wherein the surface fitting is determined using only the skin color pixels of the face region;

generating an illuminant corrected image using the surface fitting and the image; and normalizing the illuminant corrected image to generate an illuminant compensated image.

14. The computer readable medium of claim 13, wherein in the step of generating the illuminant corrected image, the illuminant corrected image is generated by subtracting the surface fitting from the image.

15. The computer readable medium of claim 13, wherein the image includes a plurality of pixels each having a gray level, and wherein the step of normalizing the image, comprises the substeps of:

computing an average gray level for the plurality of pixels in the image;

computing a standard deviation of the gray level for the plurality of pixels in the image; and transforming the gray level for each pixel of the plurality of pixels to a gray level within a predetermined range using the computed average gray level and the computed standard deviation.

16. The computer readable medium of claim 15, wherein in the step of computing the average gray level for the plurality of pixels, only the pixels of the face region are used in computing the average gray level; and wherein in the step of computing the standard deviation, only the pixels of the face region are used in computing the standard deviation.

17. A system for illuminant compensation of an image of a human face, wherein the image includes a plurality of color pixels, comprising:

means for determining a face region based on skin color pixels, wherein the skin color pixels are determined based on intensity and chrominance color of the pixels;

means for determining a surface fitting based on the face region for the image using a linear model, wherein the surface fitting is determined using only the skin color pixels of the face region;

means for generating an illuminant corrected image using the surface fitting and the image; and means for normalizing the illuminant corrected image to generate an illuminant compensated image.

18. A system for determining a surface fitting for an image that includes a plurality of pixels each having a color, and wherein the image includes a face region, comprising:

a memory; and a processor;

wherein the memory stores a program that is operative with a processor to perform a method comprising the steps of:

determining for each pixel whether the pixel's color is within a predetermined set of colors;

determining the pixel to be part of the face region if it is determined that the pixel's color is within the predetermined set of colors; and determining a surface fitting for the image using a linear model, wherein the surface fitting is determined using only the pixels that were determined to be part of the face region.

19. A computer readable medium storing a program that is operative with a processor to perform method for determining a surface fitting for an image that includes a plurality of pixels each having a color, and wherein the image includes a face region, comprising the steps of:

determining for each pixel whether the pixel's color is within a predetermined set of colors;

determining the pixel to be part of the face region if it is determined that the pixel's color is within the predetermined set of colors; and determining a surface fitting for the image using a linear model, wherein the surface fitting is determined using only the pixels that were determined to be part of the face region.

20. A system for determining a surface fitting using a linear model for an image that includes a plurality of pixels each having a color, and wherein the image includes a face region, comprising:

means for determining for each pixel whether the pixel's color is within a predetermined set of colors;

means for determining the pixel to be part of the face region if it is determined that the pixel's color is within the predetermined set of colors; and means for determining a surface fitting for the image, wherein the surface fitting is determined using only the pixels that were determined to be part of the face region.

* * * * *